(No Model.)
T. R. CAPWELL & W. C. FULLER.
VEHICLE GEAR.
No. 480,691. Patented Aug. 9, 1892.
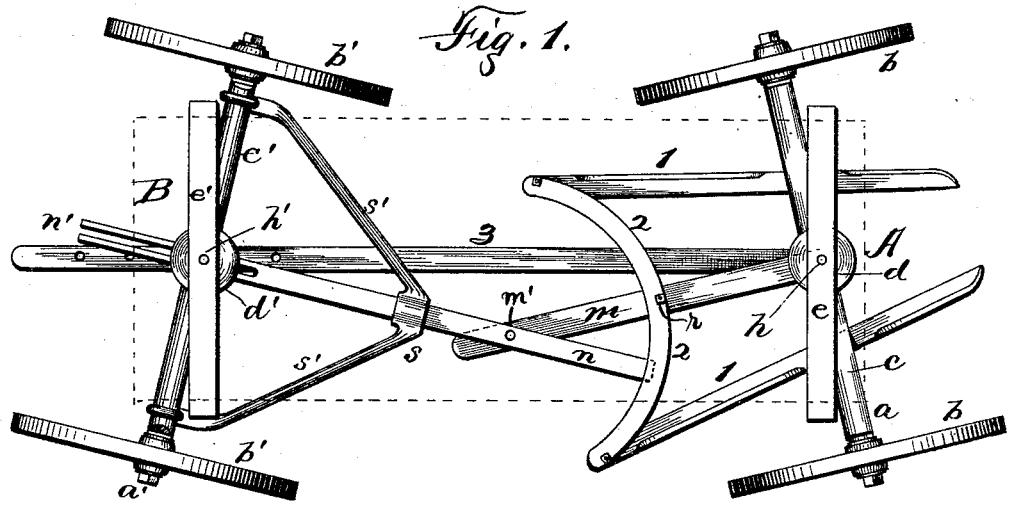
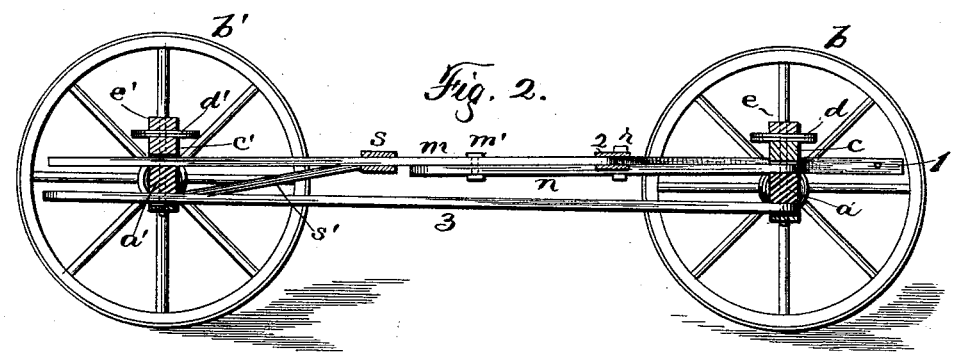
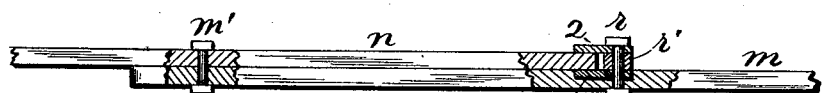
WITNESSES:
H. A. Carhart.
C. B. Kinne.
INVENTORS
Thomas R. Capwell and
William C. Fuller.
BY
Smith & Denison
ATTORNEYS

UNITED STATES PATENT OFFICE.

THOMAS R. CAPWELL AND WILLIAM C. FULLER, OF DUNKIRK, NEW YORK.

VEHICLE-GEAR.

SPECIFICATION forming part of Letters Patent No. 480,691, dated August 9, 1892.

Application filed January 15, 1892. Serial No. 418,179. (No model.)

*To all whom it may concern:*

Be it known that we, THOMAS R. CAPWELL and WILLIAM C. FULLER, of Dunkirk, in the county of Chautauqua, in the State of New York, have invented new and useful Improvements in Vehicle-Gears, of which the following, taken in connection with the accompanying drawings, is a full, clear, and exact description.

Our invention relates to vehicles, and particularly to that class in which the turning or cramping of the front axle and wheels will simultaneously and in like degree cramp or turn the rear ones, so that the front and rear wheels will always track even when turned, as in turning a corner or making a short turn.

Our object is to produce such a vehicle, in which a solid reach connects the axle and is pivotally connected to both, so that it takes the longitudinal strain, and in which a sectional false reach is connected to the axles, said sections being pivotally connected to each other, so that the front section exerts a lateral force upon the rear one whenever the front axle is turned upon the king-bolt. It is constructed as follows, reference being had to the accompanying drawings, in which—

Figure 1 is a top plan of the vehicle, partly cramped, the dotted lines indicating the box. Fig. 2 is a longitudinal vertical sectional elevation of the vehicle without the box. Fig. 3 is a vertical sectional elevation of the false reach and the hounds, illustrating the connections of the reach-sections to each other, of one of them to the hounds, and of the construction of the circle which constitutes the rear cross-bar of the hounds.

A is the front axle portion of the gear, comprising an axle $a$, wheels $b$, dead-block $c$, fifth-wheel $d$, bolster $e$ upon the fifth-wheel, and king-bolt $h$.

B is the rear axle part of the gear, comprising an axle $a'$, wheels $b'$, head-block $c'$, fifth-wheel $d'$, bolster $e'$, and king-bolt $h'$. The side rails 1 of the hounds are secured to the front axle, and the pole (not shown) is secured between their front ends, while their rear ends are connected by the curved cross-bar 2, consisting of two metallic strips held apart by the side rails between them. The reach 3 is pivotally connected to the king-bolts at each end. The false reach consists of the sections $m$ and $n$. One end of the section $m$ fits into a mortise in the front head-block and is secured by the king-bolt. It passes through under the hound-bar 2 and is secured thereto by the bolt $r$, a washer $r'$ being inserted between the sections comprising this bar. The reach-sections are pivotally connected by a bolt $m'$. The rear end of the reach-section $n$ is provided with a slot $n'$, passes loosely through a mortise in the rear head-block, and the king-bolt passes through said slot. A slide $s$ fits loosely over the reach-section $n$ and is adapted to slide thereon and is connected to the rear axle by the lateral braces $s'$, which are secured thereto by clips in the usual manner. The front end of the reach-section $n$ is extended, so that it fits loosely between the hound-bars 2, which bars are curved concentric with the pivot-bolt $m'$. When the front axle is cramped in either direction, the reach-section $m$ exerts a lateral force upon the section $n$, forcing it outward, and this, through the slide $s$ and braces $s'$, turns the rear axle and wheels correspondingly, the slide $s$ traversing the reach-section and the reach-section also sliding forwardly upon the rear king-bolt, all so that the front and rear wheels will track, while the bolsters remain stationary, as also the box thereon. It will be observed that the front and rear wheels will track when the false reaches are pivoted substantially centrally between the two axles.

What we claim as our invention, and desire to secure by Letters Patent, is—

1. In a vehicle-gear, the combination, with the axles and hounds, the reach connecting them, one of said reaches consisting of sections pivotally connected together, the forward section being secured to the axle and to the rear bars of the hounds, and the other section being provided with a slot, through which the king-bolt passes and having its front end extended forward and engaging with said hound-bars.

2. In a vehicle-gear, the combination, with the axles and hounds, the reach connecting them, one of said reaches consisting of sections pivotally connected together, the forward section being secured to the forward axle and the rear bar of the hound, said hound-bar having a groove in its rear edge, and the other section being provided with a slot, through which the rear king-bolt passes and having its front end extended forward and engage with the groove in said hound-bar.

In witness whereof we have hereunto set our hands this 31st day of December, 1891.

THOMAS R. CAPWELL.
WILLIAM C. FULLER.

In presence of—
A. J. LUNT,
ALEXR. WILLIAMS.